May 30, 1933.  A. A. BUREAU  1,911,428
REEL
Filed July 21, 1930
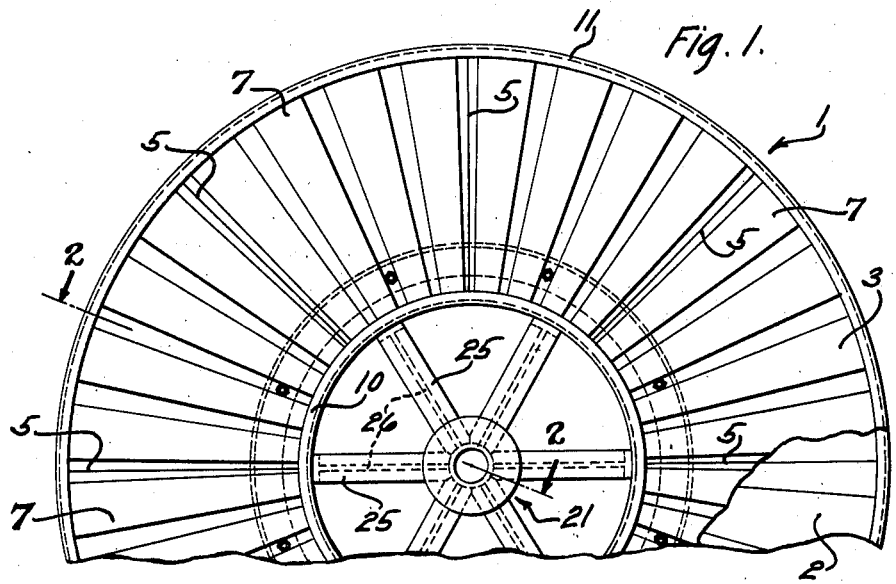
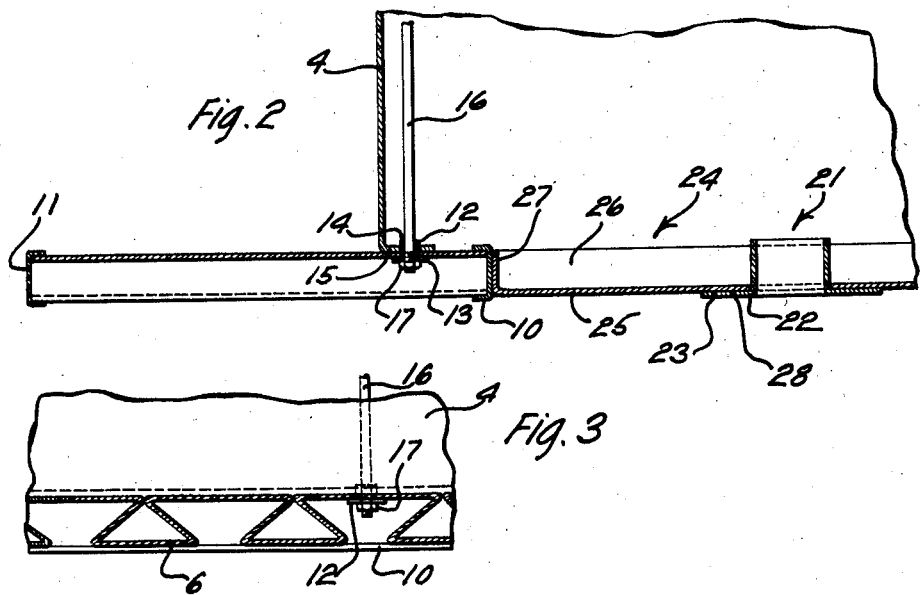
Inventor
A. A. Bureau
By H.B. Whitfield Atty.

Patented May 30, 1933

1,911,428

UNITED STATES PATENT OFFICE

ARTHUR A. BUREAU, OF CHICAGO, ILLINOIS, ASSIGNOR TO WESTERN ELECTRIC COMPANY, INCORPORATED, OF NEW YORK, N. Y., A CORPORATION OF NEW YORK

REEL

Application filed July 21, 1930. Serial No. 469,399.

This invention relates to reels, and more particularly to metallic reels for supporting wound material such as telephone cable.

An object of the invention is the provision of a simple, durable and inexpensive reel for supporting wound material.

In accordance with one embodiment, the invention contemplates the provision of a reel comprised of heads spaced apart by a flanged drum, each head being composed of sheet metal fluted radially and in a triangular conformation so as to present a smooth inner surface on the head of the reel. Circular shaped channel members are secured at the inner and outer peripheral surfaces of the heads the inner channel members having welded thereto spiders in the center of which a hub or bushing is positioned to permit mounting the reel for rotation. The drum is secured between the heads by forming a flanged portion at each side of the drum and passing through-bolts through apertures formed in the flanges and in the inner surface of the heads of the reel.

Other objects and advantages of the invention will be apparent from the following detailed description when considered in conjunction with the accompanying drawing, wherein Fig. 1 is a side elevational view of a reel embodying the features of the invention, Fig. 2 is a sectional view taken on the line 2—2 of Fig. 1 in the direction of the arrows, and Fig. 3 is an end view of the reel head with the outer circular shaped channel member removed.

Referring now to the drawing wherein like reference characters designate the same parts throughout the several views, the numeral 1 designates generally a reel embodying the features of the invention comprised of a pair of heads 2 and 3 for supporting a drum 4 therebetween. The reel head 3 is composed of a plurality of sheet metal sections 7 welded together at points 5. The sheet metal sections 7 are folded so as to provide radially extending fluting 6 which is triangular in shape as shown in Fig. 3 to provide a great degree of strength as compared with the weight of the material used to form the heads. It will be noted that the triangular shaped fluting is of such size as to provide slots on the outer surface of the head, and to provide a substantially smooth inner surface for the head.

The sections 7 of the head are welded to a circular shaped channel member 10 at their inner ends, and to a circular shaped channel member 11 at their outer ends. After the heads are so formed the drum 4 is secured in place between them by inserting flanged bushings 12 through openings 13 and 14 in the heads and flanges 15 formed on the drum 4 and thereafter passing headed through bolts 16 through the bushings and fixing them in place by means of nuts 17.

In order that the reel may be rotated upon a suitable shaft to wind or unwind material therefrom, a hub portion designated generally by the numeral 21 is provided and comprises an annular hub 22 having a shoulder 23 formed thereon. The hub 22 is secured to the head by means of a spider 24 composed of a plurality of plates 25 and 26 welded together to form T-shaped members, the member 25 being bent as shown at 27 to provide a welding surface for securing the spider to the circular channel member 10. The hub 21 is welded at 28 to the plate 25 and provides a bearing surface for the shaft not shown for supporting the reel during its rotation.

What is claimed is:

1. In a reel, a drum, and annular heads secured to the drum comprised of sheet metal fluted radially across their entire surface, said fluting presenting a plane, smooth, continuous inner surface.

2. A reel head composed of sheet metal formed with radially extending longitudinally tapered reinforcing flutings, each fluting having a surface contiguous with corresponding surfaces of adjacent flutings to thereby present a plane, smooth, continuous inner surface.

3. In a reel, a drum, annular heads secured to the drum comprised of sheet metal fluted radially, said flutings formed to provide a plane, smooth inner surface and a slotted outer surface for each head, the flutings abutting along the inner surface, and fastening means in alignment with said slots for securing the heads to the drum.

In witness whereof, I hereunto subscribe my name this 11th day of July A. D. 1930.

ARTHUR A. BUREAU.